US009958276B2

(12) United States Patent
Guichoux (10) Patent No.: US 9,958,276 B2
(45) Date of Patent: May 1, 2018

(54) METHOD FOR CALCULATING THE SURFACE SPEED OF AT LEAST ONE VESSEL AND METHOD FOR DEDUCING EACH DRIFT VECTOR AT EVERY POINT ON THE PATH OF SAID VESSEL

(71) Applicant: Yann Guichoux, Saint-Renan (FR)

(72) Inventor: Yann Guichoux, Saint-Renan (FR)

(73) Assignee: E-ODYN SAS, Plouzane (FR)

( * ) Notice: Subject to any disclaimer, the term of this patent is extended or adjusted under 35 U.S.C. 154(b) by 0 days. days.

(21) Appl. No.: 15/032,996

(22) PCT Filed: Nov. 12, 2014

(86) PCT No.: PCT/EP2014/074327
§ 371 (c)(1),
(2) Date: Apr. 28, 2016

(87) PCT Pub. No.: WO2015/071286
PCT Pub. Date: May 21, 2015

(65) Prior Publication Data
US 2016/0290812 A1    Oct. 6, 2016

(30) Foreign Application Priority Data
Nov. 12, 2013   (FR) ..................... 13 02593

(51) Int. Cl.
*B60L 3/00*    (2006.01)
*G01C 21/20*   (2006.01)
(Continued)

(52) U.S. Cl.
CPC .............. *G01C 21/203* (2013.01); *B63B 9/00* (2013.01); *B63J 99/00* (2013.01); *G01P 5/00* (2013.01); *B63J 2099/008* (2013.01)

(58) Field of Classification Search
CPC  G01C 21/203; B63B 9/00; B63J 99/00; B63J 2099/008; G01P 5/00
See application file for complete search history.

(56) References Cited

U.S. PATENT DOCUMENTS 6,032,603 A  *  3/2000  Olcott ................... B63B 41/00
                                                   114/129
6,234,853 B1 *  5/2001  Lanyi .................. B63H 21/213
                                                   114/144 R
(Continued)

FOREIGN PATENT DOCUMENTS

EP       0 319 395 A1    6/1989
EP       1775212 A2 *    4/2007  ............ B63H 21/22
(Continued)

*Primary Examiner* — Tuan C To
(74) *Attorney, Agent, or Firm* — Im IP Law; C. Andrew Im (57) ABSTRACT

A method for calculating the surface vector of at least one vessel progressing under engine at cruising speed. When the vessel is in a defined position, the parameters of the vessel, including its position, its heading, its speed over ground and its course over ground, are obtained. Wind and/or current measurements in the proximity of the vessel are obtained using a device external to the vessel. The drift vector is determined from wind and/or current measurements. The over-ground vector is determined from the parameters selected from the position, the speed over ground and the course over ground of the vessel. The magnitude and the direction of the surface vector of the vessel is calculated.

17 Claims, 5 Drawing Sheets

(51) Int. Cl.
*G01P 5/00* (2006.01)
*B63B 9/00* (2006.01)
*B63J 99/00* (2009.01)

(56) References Cited

U.S. PATENT DOCUMENTS

| | | | | |
|---|---|---|---|---|
| 6,446,003 | B1 * | 9/2002 | Green | G01C 21/20 |
| | | | | 342/357.3 |
| 6,885,919 | B1 * | 4/2005 | Wyant | B63H 21/12 |
| | | | | 340/450.2 |
| 7,267,068 | B2 * | 9/2007 | Bradley | B63H 21/22 |
| | | | | 114/144 A |
| 7,416,458 | B2 * | 8/2008 | Suemori | B63H 21/22 |
| | | | | 114/144 R |
| 8,050,630 | B1 * | 11/2011 | Arbuckle | G01S 19/23 |
| | | | | 342/357.62 |
| 8,924,054 | B1 * | 12/2014 | Arbuckle | B63H 21/21 |
| | | | | 701/21 |
| 9,248,898 | B1 * | 2/2016 | Kirchhoff | B63H 21/213 |
| 9,690,295 | B1 * | 6/2017 | Abellera | G05D 1/0206 |
| 9,718,530 | B2 * | 8/2017 | Kabel | B63J 99/00 |
| 2007/0039539 | A1 * | 2/2007 | Wilson | B63B 1/125 |
| | | | | 114/274 |
| 2007/0089660 | A1 * | 4/2007 | Bradley | B63H 21/22 |
| | | | | 114/144 A |
| 2008/0189001 | A1 * | 8/2008 | Morvillo | B63H 11/107 |
| | | | | 701/21 |
| 2009/0326824 | A1 | 12/2009 | Naumov et al. | |
| 2010/0023262 | A1 * | 1/2010 | Haney | B63J 99/00 |
| | | | | 701/469 |
| 2011/0166724 | A1 * | 7/2011 | Hiramatsu | B63H 21/213 |
| | | | | 701/21 |
| 2011/0320072 | A1 * | 12/2011 | Morvillo | B63B 39/061 |
| | | | | 701/21 |
| 2012/0259489 | A1 | 10/2012 | Hamamatsu et al. | |
| 2012/0277941 | A1 * | 11/2012 | Noffsinger | B63H 49/00 |
| | | | | 701/21 |

FOREIGN PATENT DOCUMENTS

| | | | | |
|---|---|---|---|---|
| EP | 1847455 | A1 * | 10/2007 | B63H 5/125 |
| EP | 2354798 | A1 * | 8/2011 | G01C 21/203 |
| EP | 2594900 | A1 * | 5/2013 | G01C 21/20 |
| EP | 2650645 | A1 * | 10/2013 | G01C 21/203 |
| GB | 2462414 | A * | 2/2010 | B63B 49/00 |
| KR | 2013 0104860 | A | 9/2013 | |
| WO | 2008/096376 | A1 | 8/2008 | |

* cited by examiner

METHOD FOR CALCULATING THE SURFACE SPEED OF AT LEAST ONE VESSEL AND METHOD FOR DEDUCING EACH DRIFT VECTOR AT EVERY POINT ON THE PATH OF SAID VESSEL

RELATED APPLICATIONS

This application is a § 371 application from PCT/EP2014/074327 filed Nov. 12, 2014, which claims priority from French Patent Application No. 13 02593 filed Nov. 12, 2013, each of which is incorporated herein by reference in its entirety.

FIELD OF THE INVENTION

The present invention relates to a method for measuring the surface speed of a vessel and for measuring current and wind from analysis of the drift of said vessel.

BACKGROUND OF THE INVENTION

There are a number of known solutions for measuring the surface speed of a vessel.

A first solution consists in performing navigational tests before the vessel is placed in operational service. These tests consist in measuring the speed over ground of the vessel over a given round-trip in a time interval of short duration, i.e. an interval during which wind and current conditions may be considered to be sufficiently stable. This round-trip, which is performed over a given navigational course, allows the drift of the vessel due to current and wind to be canceled out. In this case, the average speed over ground over the round-trip may be assimilated to the surface speed. This type of operation may be repeated a number of times under various navigational conditions (propulsion regimes). Repetition of this type of operation makes it possible to establish a lookup table between engine regime and surface speed, which may be used by the crew to estimate the surface speed of the vessel under normal navigational conditions. However, the surface speed values given by this solution are approximate under real navigational conditions and, furthermore, this solution requires information be obtained on the engine regime of the vessel, by way of a specific on-board sensor. This method cannot for example be used by a land-based service to simultaneously measure the surface speed of a large number of vessels engaged in operations (i.e. with a load that varies depending on the trip) in a given zone, i.e. vessels neither the loading conditions nor the engine regime of which are known with precision by the service in question.

Another solution consists in using an on-board speed sensor specifically to measure the relative speed of the vessel with respect to the surface of the water. This type of sensor is commonly called a log, and generally provides information on only one component of the surface vector (the longitudinal component corresponding to the projection of the velocity vector onto the axis of the vessel). The surface speed measured using a log is available on board the vessel but a land-based service, for example one in charge of monitoring maritime traffic, does not have access to this information. It may in certain cases be communicated thereto by the vessel using a radio transmission means, but cannot be measured directly on land from the data commonly acquired by this type of monitoring service.

There are also a number of known solutions for measuring environmental parameters such as wind and marine surface current.

Marine-Surface-Current Parameter:

Drifting buoys are one solution for measuring this parameter. These drifting buoys are used to follow the movement of a mass of water (Lagrangian drift) and to measure surface current. They periodically transmit their position via satellite telecommunication means. The drawback of these pieces of equipment is that they are unsuitable for coastal zones, especially because of the high maritime traffic density and the risk that the equipment will run aground. In addition, data are only available in non-real time and the costs of acquisition of the hardware and of deployment are high.

Another solution consists in using high-frequency (HF) or very high frequency (VHF) radars, which allow surface current measurements to be taken in coastal zones in almost-real time. The echoes received as return from the radars are multiple and very varied because of the innumerous types of waves that agitate the surface of the sea. It is known to distinguish and identify waves the wavelength of which is equal to half those emitted by the radar. Since the theoretical propagation speed of these waves in the absence of surface current is perfectly known, it is then possible to deduce therefrom by difference with the measured speed (Doppler shift), the speed of the current. However, it is necessary to have two radars scanning a given zone to reconstruct the vector of the current (magnitude and direction) from the radial components measured by the two radars at a given point. The common measurements of the two radars then allow a map of the surface currents to be charted. The area of the measurement zones remains quite small and the spatial resolution of the measurements is low (about 25 $km^2$), especially when the measurement distance from the radar is large. HF radars allow measurements to be taken up to a distance of 200 km from the coast. This type of equipment is very expensive.

Another solution is measurement from satellite platforms. It is possible to measure surface current using satellite radar images (referred to as synthetic aperture radar or SAR images). This solution allows radial measurements of the current to be obtained over vast areas but with low resolution. It is also possible to use a satellite-mounted altimeter and to measure surface current by interpreting differences in ocean surface level (geostrophic hypothesis). However, this method is limited, because of the small number of satellite altimeters able to provide the most regular possible temporal and spatial coverage and also because the current measurements concern large-scale movements of the entirety of the water column and not the surface current directly. It is also possible to estimate surface current using satellite measurements of the ocean surface temperatures or water color (optical means). These methods are not very effective in the presence of clouds and at the present time do not satisfactorily take account of the dynamics of real surfaces. Generally, measurements taken using satellites are transmitted with a delay, which depends on the telecommunication systems used, between space and earth and the measurements carried out are less precise than those carried out for example using a high-frequency coastal radar.

Another solution consists in using a current meter intended to measure the flow speed of the water at a fixed position (Eulerian measurement of current). This measurement may be taken using buoy-mounted mechanical current meters, or the current meters called acoustic Doppler current profilers (ADCP). The measurements performed using this type of instrument are localized (measurement over large geographical zones is not possible) and the maintenance of instruments deployed at sea is expensive.

Another solution consists in equipping vessels with Doppler current meters, often referred to by their abbreviation VM-ADCPs (for vessel-mounted ADCPs). The vessel-mounted Doppler current meter is a piece of apparatus capable of recording a profile of current velocities and current directions. These data may be transmitted in almost-real time, if the vessel taking the measurements is equipped with suitable telecommunication means. However, few vessels are equipped with this type of expensive measuring equipment, which is furthermore difficult to calibrate. These vessels therefore do not allow continuous measurements to be obtained over vast maritime areas.

Another known solution consists in exploiting the navigational parameters of a vessel (speed over ground, heading, surface speed) to deduce information on the marine currents by analyzing the drift of the vessel. This technique is commonly referred to as dead reckoning and is used to approximately estimate surface current. The position, heading and speed over ground of the vessel are measured at a given instant. A second measurement of the same parameters is taken at another instant, conventionally a few hours afterward. These two measurements of navigational parameters taken at different instants allow surface current (or drift current) to be estimated. A vessel navigating in a zone with no surface current will arrive at a given instant at a position predicted beforehand. In the presence of a current, the vessel will have deviated from its course and will not be at the predicted position. It is then possible to obtain an estimation of the drift current by summing vectorially the course estimated on the basis of the navigational parameters measured at a given instant and the actual course followed by the vessel. However, this technique does not allow a precise measurement of surface currents to be taken in real time since it especially requires a posteriori knowledge of the course actually followed by the vessel.

Marine-Wind Parameter:

Ocean surface winds may be measured by means analogous to those described for measuring surface current. One solution consists in using a buoy-mounted anemometer and weathervane. Another solution consists in using radar measurements, the radars possibly being land- or satellite-based (measurement of wind by scatterometry or SAR imagery). These solutions suffer from the same drawbacks as those mentioned above with regard to current measurement, namely high maintenance and implementation costs, low spatial coverage when the solution is able to provide a high spatial and temporal resolution (case of wind measurements at fixed points) or, conversely, a large spatial coverage but with a low spatial and temporal resolution (case of satellite means).

More generally, the use of environmental parameters such as wind and current to optimize the course of a vessel is widespread. Document US2012/0259489 for example describes a system for automatically piloting a vessel allowing its course to be optimized by taking into account environmental parameters such as wind and current measured using vessel-mounted sensors. The optimization system presented consists in adapting the surface speed of the vessel (i.e. its engine regime) to follow a planned (i.e. set, but not actual) course with respect to the seabed. The described system requires measurements to be taken of environmental parameters such as wind and current, at the position of the vessel, using sensors specifically mounted on board. It is also necessary to know the surface speed of the vessel, determined using another on-board sensor dedicated to this purpose and directly connected to the engine block. Document EP 0319395 also describes a system for controlling or assisting with maritime navigation exploiting environmental data such as wind and current. Just like the aforementioned system, this document describes a system that requires a speed sensor to be mounted on board the vessel to measure the surface speed of the vessel, i.e. a speed measurement that may be used to deduce a measurement of drift current.

These two documents also mention the use of statistical databases (such as current atlases) or forecast models, i.e. data that are by nature different from actual measurements. These data do not have the precision required to determine the actual surface speed of the vessel in question at a given instant or the actual drift current in proximity thereto and for this reason these documents also describe the use of additional measurements carried out using on-board sensors, to mitigate this difficulty.

The aim of the present invention is to palliate these drawbacks and to provide a method that, while nonetheless being simple to implement, allows the surface speed of a vessel to be calculated and wind and marine surface currents to be measured.

OBJECT AND SUMMARY OF THE INVENTION

An automatic identification system, referred to by the acronym AIS below and specified in the ITU document 1371.1 and its successive versions, is a VHF telecommunication system; the VHF data exchange system (VDES) being developed by international standardization organizations, which piggybacks on the AIS, is considered in the method to form part of the AIS. The AIS allows information, such as for example identity, position, heading, speed, cargo, etc., to be automatically exchanged between vessels. Coastal AIS stations deployed on the coastline make it possible to regulate these automatic transmissions and collect the information transmitted by vessels located in VHF range thereof. Many countries across the world have AIS networks and receive, in real time, information on the path of vessels. Other tracking and data-collecting systems exist, such as for example coastal and satellite-based radars, LRIT (long range identification and tracking), and VMS (vessel monitoring system). These systems use satellite telecommunication means such as Inmarsat (name of the company: International Maritime Satellite Organization), Iridium (company name designating a global telecommunications system) or Argos (worldwide system for tracking and collecting geo-positional data by satellite) to transmit vessel-path information.

The invention provides a method for calculating the surface vector of at least one vessel progressing under engine at cruising speed, characterized in that it comprises the following steps when said vessel is in a defined position:

a) obtaining parameters of said vessel including its position, its heading, its speed over ground and its course over ground;

b) obtaining measurements, selected from measurements of wind and current, using a means external to said vessel, said measurements being taken in proximity to said vessel;

c) determining the drift vector from the one or more measurements obtained in step b), i.e. measurements selected from measurements of wind and current;

d) determining the over-ground vector from parameters selected from the position, the speed over ground and the course over ground and obtained in step a); and e) calculating the magnitude and the direction of the surface vector of the vessel.

By measurement, what is meant is a physical quantity observed in a given medium and obtained using a sensor. A measurement of surface current at a given position and instant for example corresponds to a value of the current actually observed and acquired using a measuring instrument.

By data originating from a database, what is meant is any data issued from measurements whether processed or not.

By vessel, what is meant is a vessel progressing under engine.

By position of a vessel, what is meant is its geographical position at a given instant.

By proximity to a vessel, what is meant is temporal and spatial proximity. Spatial proximity may be defined by a zone centered on the position of said vessel and of radius smaller than or equal to 2 km, or even smaller than or equal to 10 km. It is also possible to consider in certain cases a zone of greater extent about the vessel, for example having a radius of several tens of kilometers, typically about fifty kilometers. Temporal proximity is defined by a time interval of two hours centered on a given instant. In certain cases, a time interval of greater extent, typically of 7 hours, may also be considered. For example, by collection of a parameter such as wind in proximity to a vessel, what is meant is the collection of the wind in a geographic zone centered on the position of the vessel at a given instant and possibly as much as one hour before the vessel actually reaches this geographical position and up to one hour afterward.

By external means, what is meant is any remote-sensing means, such as optical or radar or remote-receiving systems (such as the AIS, Iridium, Inmarsat or Argos for example), not mounted on board a vessel and allowing at least one parameter of said vessel such as its position, its heading, its speed over ground, its course over ground and the wind and current in proximity thereto to be collected.

By cruising speed, what is meant is the speed of a vessel corresponding to a constant engine regime in one or more phases of the path followed between the exit from the departure port and the entrance into the arrival port. This cruising speed does not comprise the phases of acceleration and of deceleration during the exit from the departure port and the entrance into the destination port. The path of a vessel between its departure port and its arrival port may include a plurality of navigational phases during which the motor regimes differ. In the context of the present invention, the vessel is considered during all these phases to be progressing at cruising speed.

By the heading of the vessel, what is meant is the direction in which its stem is pointing or even the angle between North and the direction in which its stem is pointing.

By surface vector, what is meant is the velocity vector the direction of which is given by the heading of the vessel and the norm of which corresponds to the value of the speed of movement of the vessel in a frame of reference attached to the surface of the water.

By surface speed, what is meant is the norm of the surface vector.

By drift vector, what is meant is the velocity vector resulting from the action of wind and current on the vessel and its cargo. It is possible in certain cases to also consider the action of swell.

By over-ground vector, what is meant is the velocity vector the direction of which is given by the direction of movement of the vessel and the norm of which corresponds to the value of the speed of movement of the vessel in a frame of reference attached to the seabed.

By course over ground, what is meant is the angle between North and the direction followed by the vessel subject to drift due to wind or current.

By speed over ground, what is meant is the norm of the over-ground vector.

By current, what is meant is a value of the current, this value being characterized by its magnitude and its direction at a depth comprised between 0 and 20 meters. It is also possible in certain cases to consider a depth comprised between 0 and 40 meters or even between 0 and 200 meters.

By wind, what is meant is a value of the wind, this value being characterized by its magnitude and its direction at an altitude comprised between 0 and 10 meters. It is also possible in certain cases to consider an altitude comprised between 0 and 30 meters or even between 0 and 100 meters.

The advantages of the method make it possible:
  to calculate the surface speed of said cruising vessel using means external to said vessel, i.e. this speed is not measured directly by a specialized instrument mounted on board said vessel (log or sensor connected to the engine for example);
  to calculate the surface speed of said cruising vessel using means external to said vessel, by exploiting current and wind measurements collected in proximity to said vessel using external means, i.e. without using specialized instruments mounted on board the vessel for example (a VM-ADCP or an anemometer for example);
  to measure and to collect on land or on board another vessel the surface speed of said vessel solely on the basis of navigational information collected using remote-sensing means such as a radar or remote-receiving means such as the AIS for example, whatever the navigational conditions of said vessel (load conditions and engine regime for example);
  to use existing infrastructure for monitoring maritime traffic to measure the surface speed of many vessels simultaneously, whatever the load of the vessels in question;
  to mitigate a long-standing but until now unsolved problem, i.e. to calculate under operational conditions and simultaneously the surface speed of a multitude of vessels progressing in zones of vast extent. It is moreover noteworthy that means that have existed for very many years, such as external means for measuring environmental parameters (for example: wind and current) and means for collecting navigational parameters (for example: the AIS) are used to calculate the surface speed of a plurality of vessels without the need to specifically use means for measuring speed of movement located on said vessels.

In one embodiment, the parameters of step a) or the measurements of step b) are acquired in real time.

By real time, what is meant is the fact that the values of the parameters are transmitted to or collected by the processing means without waiting until the end of the measurement run. For example, parameters measured using vessel-mounted sensors and transmitted by AIS are emitted in real time. Parameter measurements taken from a coastal radar and transmitted to a processing means are also considered to be carried out in real time. The collection of parameters by a satellite means that must fly over a ground station before transmitting its measurements is also considered to be carried out in real time.

In one embodiment, the parameters of step a) or the measurements of step b) are acquired in non-real time.

By non-real time, what is meant is the fact that the values of the parameters are not transmitted in real time. Data stored in a file and processed at the end of a measurement run are for example considered to be data accessible in non-real time.

In one embodiment, the parameters of step a) are obtained during a time interval of at least two seconds.

Applying the method over a duration of at least two seconds allows a plurality of position, heading, speed-over-ground and course-over-ground information items to be collected for a given vessel when these data are transmitted by AIS. It is then possible to apply the method at a plurality of vessel positions while using the same environmental data collected in step b). The multiple surface vector values obtained may for example be averaged to consolidate the calculation of the surface vector.

In the case of a coastal zone with a tide, it is preferable to obtain parameters during at least one half tidal cycle. Obtaining parameters makes it possible to exclude environmental parameters from the calculation of the surface speed of a cruising vessel:
- by performing a statistical calculation for a large number of values of speed over ground so as to "on average" cancel out drift, the average speed over ground then being considered to be equal to the surface speed;
- by limiting the values used to a few values chosen when the heading of the vessel and the course over ground of the vessel are equal or opposite; the method for calculating surface speed is improved by limiting the values used to data characteristic of the dynamics of the vessel, such as data corresponding to instants when the speed over ground is minimal, the speed over ground is maximal or even when the drift speed is zero.

In one embodiment, the parameters of step a) are collected by remote-sensing means external to said vessel, i.e. means such as optical or radar systems.

In another embodiment, the parameters of step a) are received by receiving means and transmitted by the vessel using a telecommunication means such as AIS, Iridium, Inmarsat or Argos.

Thus, the method may apply to vessels that have or do not have telecommunication means for transmitting the parameters of the vessel. The method also allows an additional means to be used to consolidate the position and speed-over-ground information obtained by AIS, Argos, Iridium or Inmarsat. This remotely sensed information allows the method to be applied without being on the vessel.

In one embodiment, step d) is carried out by a system not located on board the vessel.

In one embodiment, the calculation of step e) of the magnitude and direction of the surface velocity vector of the vessel is performed by summing the drift vector obtained in step c) and the over-ground vector obtained in step d).

In one embodiment, said method comprises the following steps:
- obtaining a series of values of the speed over ground of said vessel at various instants, said values being calculated from at least two positions of said vessel;
- processing the series of values at various instants, i.e. the series obtained in the preceding step, using a signal processing technique suitable for filtering the components of the signal due to surface current or to wind; and
- calculating the value of the surface speed of said cruising vessel from the result of the processing of the series of values.

In another embodiment, the series of values of the speed over ground of the vessel consists of values corresponding to instants at which the surface vector of the vessel is collinear with its over-ground vector.

According to this embodiment, during the signal processing, the surface vector is collinear with the over-ground vector. By limiting the values used to a few values chosen when the heading of the vessel and the course over ground of the vessel are equal or opposite, the method for calculating surface speed is improved by limiting the values used to data characteristic of the dynamics of the vessel, such as data corresponding to instants when the speed over ground is minimal, the speed over ground is maximal or even when the drift speed is zero.

In another exemplary embodiment, the collinearity of the surface and over-ground vectors is not strict and the surface and over-ground vectors are considered to be collinear when their axes differ by less than 5 degrees.

In one embodiment, said method comprises a step of representing the drift vector of the vessel or its components due to wind or current in real time or in non-real time in a defined space.

The method allows the current or wind to be displayed for interpretation of the information by the end user. The method also allows a high temporal and spatial measurement resolution to be obtained, even though the measurements are acquired in real time.

According to a second aspect, the invention also relates to a method for calculating each drift vector at every point on the path of a vessel progressing under engine at cruising speed, this method comprises the following steps:
- aa) implementing the method for calculating the surface speed of a vessel as claimed;
- bb) obtaining at every point on the path of the vessel parameters including its position, its heading, its speed over ground and its course over ground; and
- cc) calculating the drift vector at every point on the path of the vessel by summing the surface vector the norm of which was calculated in step aa) and the over-ground vector calculated from the parameters obtained in step bb).

The advantages of the method make it possible:
- to measure environmental parameters such as the wind or current at each position of said vessel using means external to said vessel, i.e. these parameters are not measured directly by a specialized instrument mounted on board the vessel;
- to measure and to collect on land or on board another vessel environmental parameters such as the wind or current at each position of said vessel;
- to measure and to collect environmental parameters such as wind or current in zones located out of range of coastal remote-sensing means such as optical or radar means;
- to measure and to collect environmental parameters such as wind or current. These measurements being more precise than those obtained using satellite-based radar or optical remote-sensing means;
- to measure and to collect environmental information over vast areas because of the long trips made by many vessels;
- to obtain repeatable measurements, i.e. measurements taken in identical geographic zones but at different instants;
- to achieve a low production and operating cost because existing infrastructure, which is used for other purposes, is piggybacked.

The invention also relates to a computer program product comprising a series of instructions, said series causing, when loaded into a computer, said computer to execute the steps of the method.

BRIEF DESCRIPTION OF THE FIGURES

Other features and advantages of the invention will become more clearly apparent in light of the following description, which is given on the basis of the appended drawings. These examples are given by way of nonlimiting example. The description is to be read with regard to the appended drawings, in which.

DESCRIPTION OF EMBODIMENTS OF THE INVENTION

Figure 1:
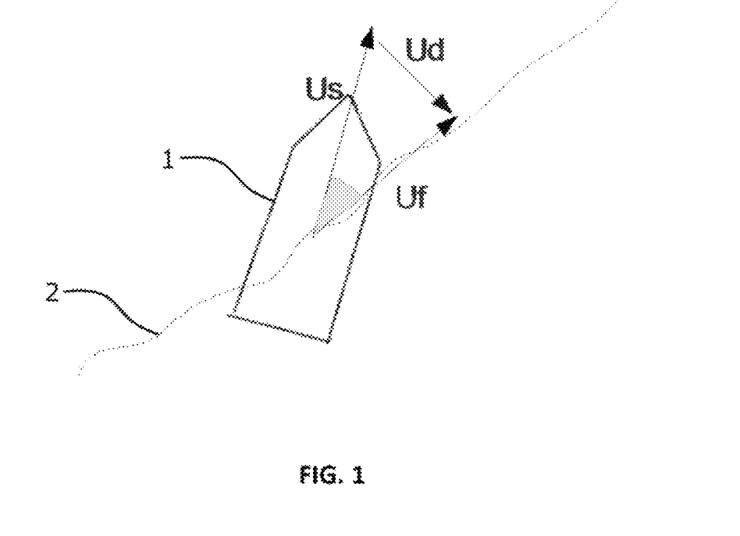
FIG. 1 shows a schematic view of various vectors at a position of a vessel on its path.

FIG. 1 shows a cruising vessel. The vessel is subject to the effects of wind and marine currents: its speed over ground Uf (in a frame of reference attached to the seabed) varies proportionally to the forces exerted on the vessel in its entirety (hull and cargo) by currents and/or wind.

The relationship between the over-ground vector Uf of a vessel and the surface vector Us (in a frame of reference attached to the surface of the water) features the drift vector Ud: Uf=Us+Ud.

The magnitude and the direction of the drift vector are related to the force of the marine current and to the force of the wind that act on the vessel. This is particularly the case for a vessel of large air draft, which will be sensitive to the forces exerted both by wind and by current. In the case of a vessel of small air draft, for which the force of the wind may be neglected, said vessel will be subject only to the force exerted by the current. The drift vector will then be identical to the current vector.

The method consists in using the drift information of a cruising vessel to obtain the current and/or wind (for example at every point on its path) in a defined space.

The method firstly seeks to characterize the various drift, over ground and surface vectors.

At a given position along its path 2, the vessel 1 has a speed over ground denoted Uf. When the vessel 1 is at cruising speed, in step a) of the method, it is necessary to obtain parameters including its position, its heading, its speed over ground, and its course over ground from data accessible from databases or in real time. In step b) of the method, it is necessary to obtain by means external to said vessel 1 at least one parameter selected from the wind and current in proximity to said vessel 1 from data accessible from databases or in real time. Step b) gathers environmental information. For example, the method gathers the marine current and/or wind at this position or at a nearby position. It is possible to gather this information by applying the method to a nearby vessel. It is also possible to gather a series of pieces of information such as the position, heading, speed over ground and course over ground of the vessel 1. The speed-over-ground and course-over-ground information may also be calculated from at least two vessel positions that are not far apart. It is possible to gather all this information from a real-time data stream or from a database.

Next, in a step c), this information is used to determine the drift vector Ud from the current and/or wind at the position of the vessel. Depending on the wind and/or current, it is possible to determine the drift vector associated with the vessel. For example, in the case of a vessel with a small air draft, the only drift that the vessel will be subject to is the current. Whereas in the case of a vessel with a large air draft (example: a container ship), the current vector (norm and direction) and the wind vector (norm and direction) are used to determine the drift vector Ud at a position of the vessel.

After the drift vector has been obtained, it is possible to display it on a marine chart.

Next, in a step d), this information is used to determine the over-ground vector Uf.

The step e) serves to calculate the vector Us of the vessel. Specifically, by the vectorial sum of the relationship Uf−Ud, the vector Us is obtained.

After the vector Us has been obtained, it is possible to display it on a marine chart.

Figure 2:
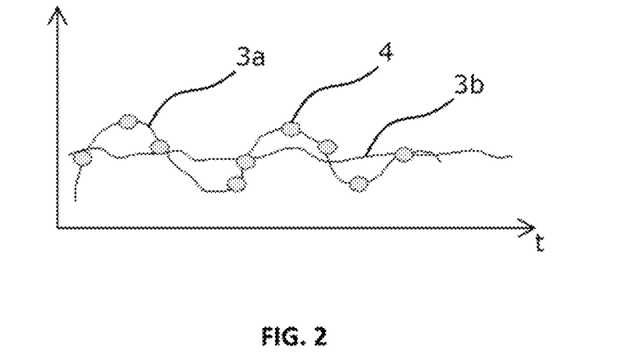
FIG. 2 shows a graph of plots of speed over ground.

Another way of calculating the surface vector Us is shown in FIG. 2. In this figure, a plurality of data have been collated. The y-axis of this figure corresponds to the norm of the over-ground vector (norm denoted Nf) and the x-axis, referenced t, corresponds to time. The curve (referenced 3a) of the values of Nf shows all of the values of Nf over a number of tidal cycles. The curve has a pseudo-period corresponding to the oscillation of the tide in the case where the vessel navigates in a zone influenced by tidal currents. The curve 3b represents the values Nf issued from the same values Nf but after a tidal wave filter has been applied.

To filter the tidal wave, it is possible to use a conventional signal processing method applying for example the Doodson X0 filter to the collected data. This filtering has the effect of suppressing the influence of the tidal current on the dataset. Specifically, tidal current is the dominant current in many regions of the globe, such as the English Channel for example.

The circles 4 show the instants when the over-ground vectors and surface vectors are collinear.

The mean or median of a plurality of values of the norm Nf is an approximation of the magnitude of the surface speed. The precision of the approximation of Ns obtained from the values of Nf is improved by increasing the number of values Nf used in the calculation of the mean or median or indeed by selecting data issued from positions chosen when the surface and over-ground vectors are collinear. At these instants, the drift vector is either zero, or opposite in direction to the movement of the vessel, or in the same direction as the direction of movement of the vessel. By this method, the norm of the surface vector Us is therefore obtained.

The method allows each drift vector and its components due to wind or current to be represented on a marine chart at every point on the path of a vessel.

The fact of having calculated the cruising surface vector for each vessel allows the drift vector to be calculated for each position of the vessels. Specifically, since the cruising surface vector Us and the over-ground vector Uf are known, it is possible to calculate, using the relationship Us=Uf+Ud, all the drift vectors at each position of the vessel. It is then possible to obtain an image of the drift vectors in real time and in non-real time.

Figure 3:
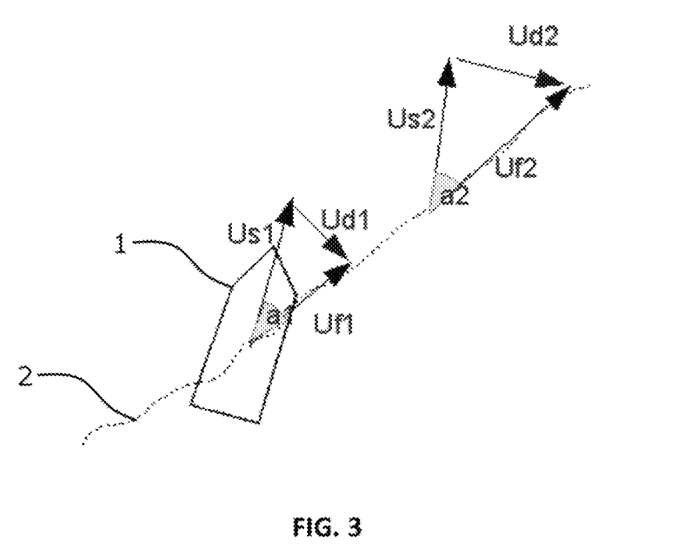
FIG. 3 shows the current vectors measured using the method that is the subject of the present invention along the path of a given vessel.

FIG. 3 shows the method for deducing drift, surface and over-ground vectors in a defined space for another position of the vessel.

The deducing method comprises collecting and reading information relating to position, heading and course-over-ground parameters of a vessel progressing at cruising speed at various defined instants.

The deducing method also comprises implementing, for each collected position of the vessel 1, the method (described above) for calculating parameters, so as to obtain the magnitude and direction of each drift vector at every point on the path of a vessel.

On the vessel 1 are positioned the over-ground vector Uf1, the surface vector Us1 and the drift vector Ud1. The angle made by the surface vector Us1 and the over-ground vector Uf1 is referenced a1. By applying the method and the relationship Uf=Us+Ud, it is possible to obtain, at any position of the vessel, the drift vector.

FIG. 3 shows, for another position of the vessel 1, the over-ground vector Uf2, the surface vector Us2 and the drift vector Ud2. The angle made by the surface vector Us2 and the over-ground vector Uf2 is referenced a2.

Figure 4:
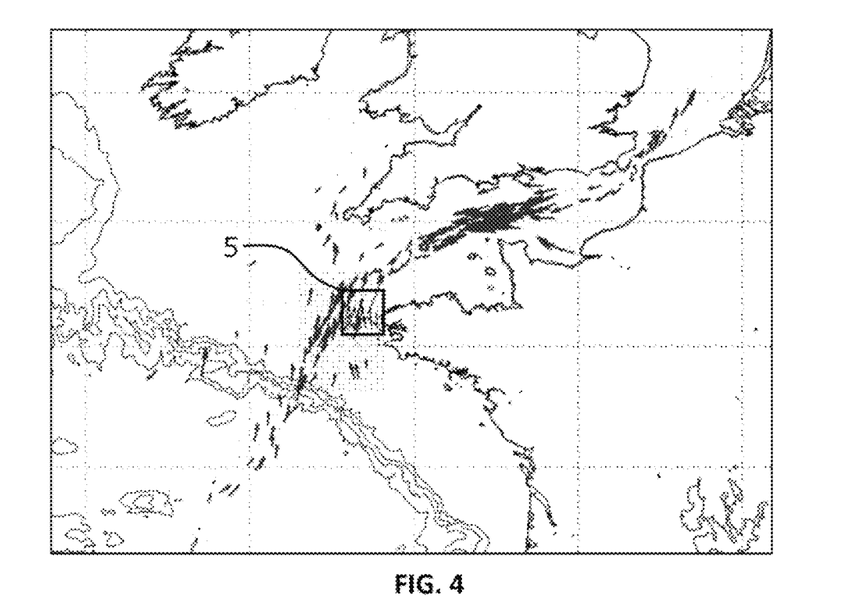
FIG. 4 shows a chart on which are showing the surface current vectors calculated using the method.

FIG. 4 shows results obtained using the method that is the subject of the present invention. Current vectors in the English Channel and in the Atlantic have been shown, at the positions of many vessels, by exploiting the parameters of vessels collected using three AIS receivers installed on the coast (one vector per vessel). In this figure, measurements carried out using two HF radars (zone located inside the black box 5) and the results of the method implemented according to one exemplary embodiment allowing current to be measured over vast geographical areas, are compared. This figure indeed shows that the method is usable at lower cost without need for vessel-mounted sensors for measuring wind or current.

FIG. 4 notably illustrates the improvement obtained, in terms of the area of the measurement zone, by virtue of the method, with regard to the measurement zone conventionally achieved with HF radars. The vectors shown in the box 5 located at the center of the chart were measured using two HF radars. They are aligned with those vectors located outside the box 5 which are not very far from the zone bounded thereby. All the other vectors located in the English Channel and in the Atlantic were calculated by way of the method described above using vessel navigational parameters collected using 3 AIS receivers.

Contrary to received ideas in the fields of navigation and measurement of metrological-oceanic parameters, the methods described above for calculating the surface speed of at least one vessel and deducing each drift vector at every point on the path of said vessel, noteworthy in that they use means for measuring environmental parameters external to said vessel and navigational parameters acquired when said vessel is progressing under engine at cruising speed, provide results with a high precision, at least comparable to the precision of measurements obtained using the expensive systems most commonly used (HF radar and spatial altimetry for the measurement of current for example).

In the field of the measurement of environmental parameters such as wind and current, the surprising quality of the measurements obtained using the method that is the subject of the present invention makes it possible to envision its application over extremely vast geographical areas, at an exceptionally low cost.

Figure 5:
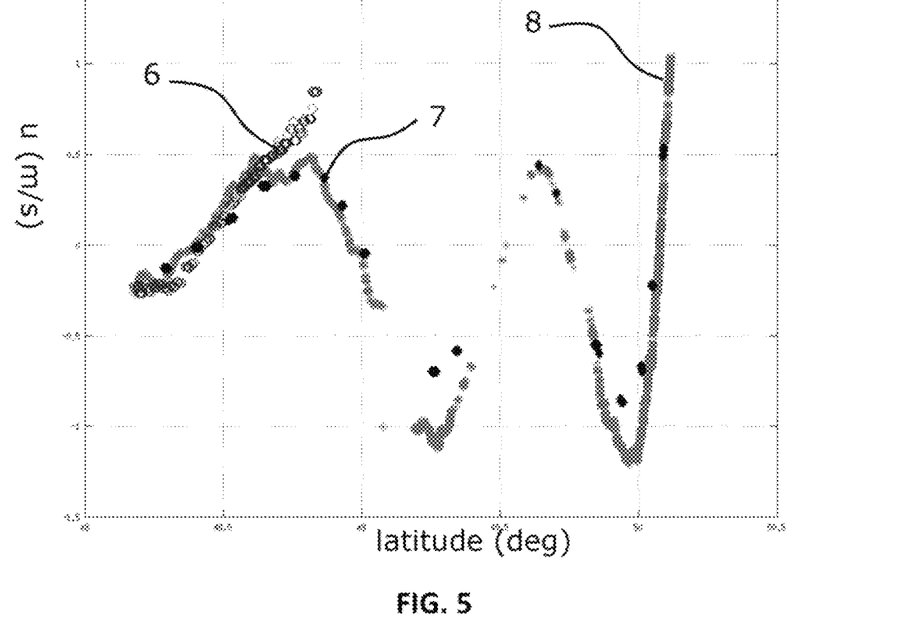
FIG. 5 shows a graph comparing the current vector results measured using HF radar, a numerical model, or the method according to one exemplary embodiment.

FIG. 5 shows a graph showing the west-east component of the current vector measured at each position of a given vessel as a function of latitude. FIG. 5 illustrates the highly qualitative character of the current measurements obtained using the method that is the subject of the present invention.

The graph compares a number of results, namely:
  the results of measurements carried out using two HF radars at the position of a given vessel (shown in the form of circles 6): the curve shown increases with latitude and is of short length, thus illustrating the limits in terms of spatial coverage of measurements taken by HF radar with regard to measurements carried out using the method that is the subject of the present invention.
  the results obtained using a numerical model at the position of the vessel (represented by lozenges, 7): this sinusoidal curve allows the variations in surface current in the English channel due to the tidal signal to be seen. This curve is not the result of measurement and therefore merely provides an estimation of the actual current.
  the results obtained using the method that is the subject of the present invention (represented by asterisks, 8). This curve is also sinusoidal and varies in the same way as the curve presenting the results obtained using a numerical model.

From this figure it may be seen that the method that is the subject of the present invention reflects current variations due to the tide, and with greater precision than HF radar. Specifically, the curve formed from circles departs from the curve formed from lozenges at its right end, in contrast to the curve formed from asterisks.

Figure 6:
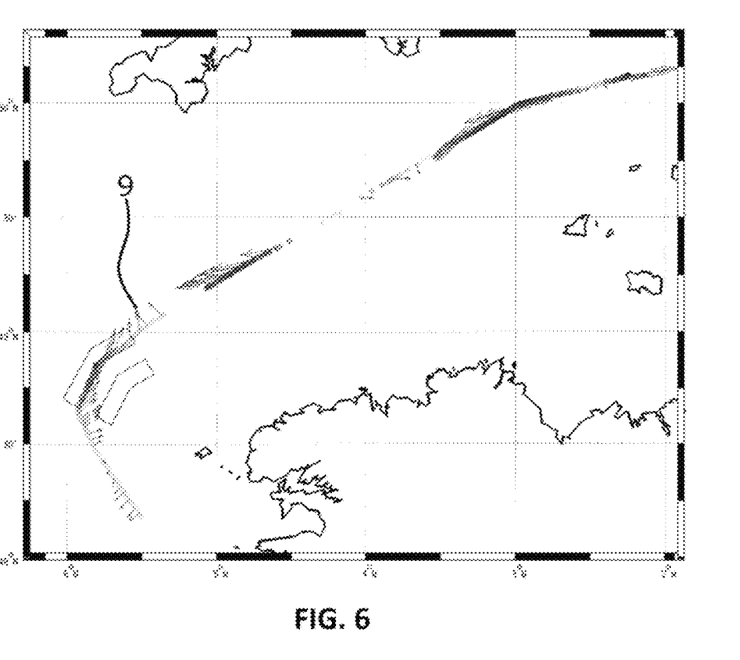
FIG. 6 shows a graph of the current vectors measured using the method for a given vessel at every point on its path and in one defined place.

FIG. 6 illustrates current vectors 9 measured using the method that is the subject of the present invention at every point on the path of a given vessel in a defined space.

Figure 7:
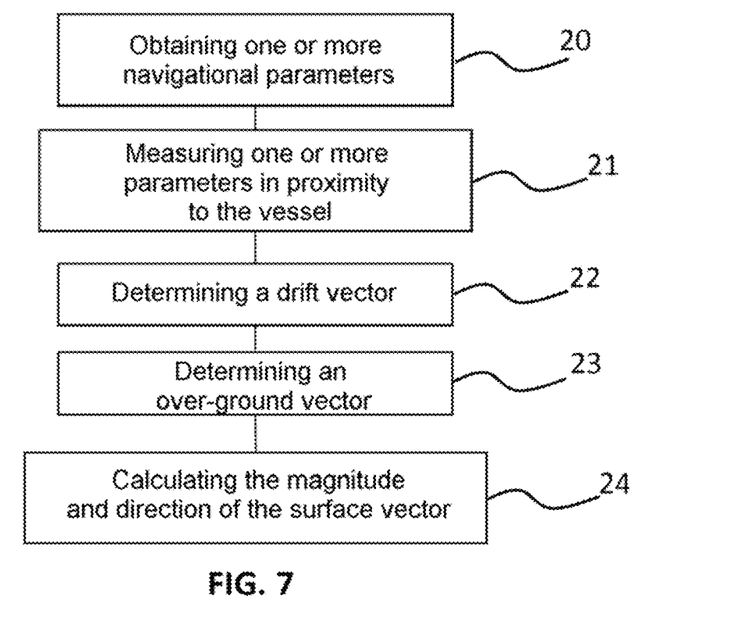
FIG. 7 shows, in the form of a flowchart, the steps implemented in one particular embodiment of the method that is the subject of the present invention.

FIG. 7 shows the method for calculating the surface vector of at least one vessel, which is the subject of the present invention and includes:
  a step 20 of obtaining one or more navigational parameters;
  a step 21 of measuring one or more parameters in proximity to the vessel;
  a step 22 of determining a drift vector;
  a step 23 of determining an over-ground vector; and
  a step 24 of calculating the magnitude and direction of the surface vector.

In step 20, one or more navigational parameters are collected in real time or in non-real time.

In step 21 wind and/or current measurements (direction and magnitude) are taken in proximity to the vessel; these measurements are either taken using a remote-sensing means allowing the measurements to be taken without using sensors mounted on board the vessel, or taken using measuring means located in proximity to the vessel (but not there on board), and transmitted to a remote land-based center or to another remote vessel using a telecommunications means such as the AIS or Argos for example.

In step 22, the drift vector is calculated using the current and/or wind measurements obtained in step 21.

In step 23, the over-ground vector is calculated using the navigational parameters obtained in step 20.

In step 24, the surface vector is calculated using the results of steps 22 and 23; the surface vector is obtained by summing the over-ground vector and the drift vector.

Figure 8:
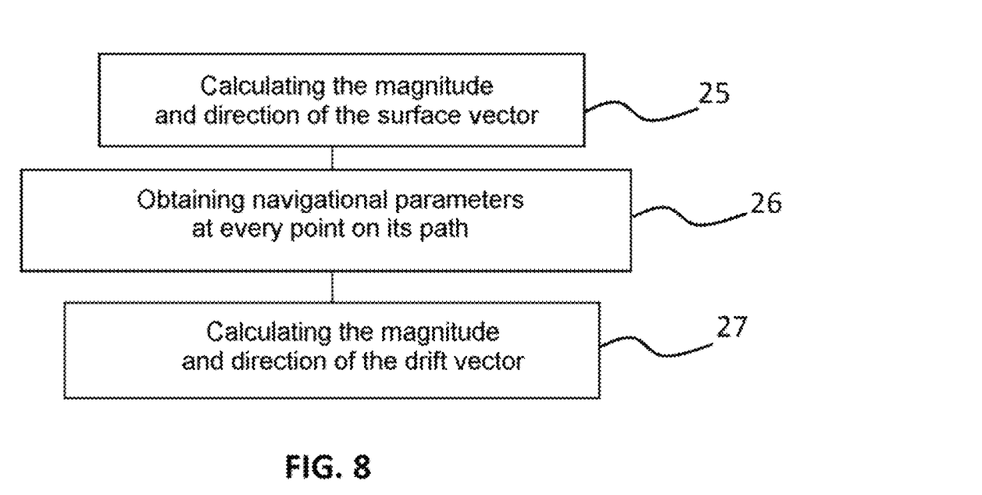
FIG. 8 shows, in the form of a flowchart, the steps implemented in one particular embodiment of the method that is the subject of the present invention.

FIG. 8 shows the method for deducing each drift vector at every point on the path of said vessel, which is the subject of the present invention and includes:
- a step 25 of calculating the surface speed of the vessel;
- a step 26 of obtaining one or more navigational parameters of the vessel; and
- a step 27 of calculating the drift vector.

In step 25, the surface speed of the vessel is calculated at a given instant using the method described in FIG. 7.

In step 26, navigational parameters of the vessel are collected in real time or in non-real time at every instant and at every point on the path of the vessel in a defined space. These parameters allow the speed over ground to be calculated.

In step 27, the over-ground vector and the surface vector are summed to calculate the drift vector at every point on the path. The surface vector norm used in this step is that obtained in step 25.

Figure 9:
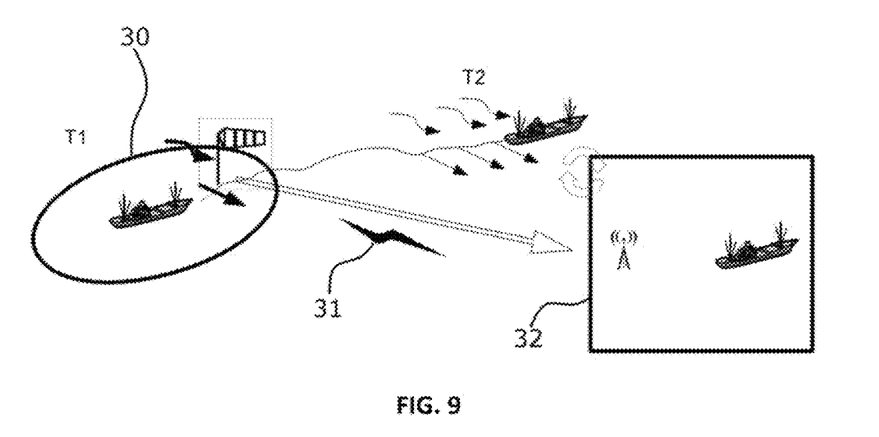
FIG. 9 shows, in the form of a schematic, a representation of the measuring steps of the method in one particular embodiment of the method that is the subject of the present invention.

FIG. 9 illustrates the general operation of the method that is the subject of the present invention:
- a step of measuring current and wind in a zone 30 in proximity to the vessel and at an instant T1, without using sensors mounted on board the vessel; these measurements may be transmitted in real time or in non-real time to a land-based center or to a vessel other than that to which the method is being applied, having telecommunication and processing and optionally remote-sensing capacities, see the black box 32.
- a step of calculating the surface speed of the vessel at an instant T1 using the navigational parameters of said vessel and the measurements 31 of current and wind obtained at T1.
- a step of calculating the current and wind at an instant T2 when the vessel is no longer in the zone of proximity in which the measurements of current and wind were taken; the calculation is performed by summing the surface vector calculated at T1 and the speed over ground obtained at T2, by the land-based center or the other vessel.

The invention claimed is:

1. A method for calculating surface vectors of a plurality of vessels, each vessel progressing under an engine at a cruising speed, in response to said each vessel in a predefined position, further comprising the steps:
   obtaining parameters of said each vessel including its position, its heading, its speed over ground and its course over ground from a remote sensor external to said each vessel;
   obtaining at least one of wind and current measurements in proximity to said each vessel using the remote sensor external to said each vessel;
   determining a drift vector for said each vessel by processing said at least one of wind and current measurements by a computer of a remote land-based center;
   determining an over-ground vector for said each vessel by processing at least one parameter selected from the position, the speed over ground and the course over ground of said each vessel by the computer of the remote land-based center; and
   simultaneously calculating a magnitude and a direction of the surface vector of said each vessel of said plurality of vessels under operational conditions progressing in a maritime area by the computer of the remote land-based center to monitor a maritime traffic over the maritime area.

2. The method as claimed in claim 1, wherein the parameters or said at least one of wind and current measurements are acquired in real time.

3. The method as claimed in claim 1, wherein said at least one of wind and current measurements are acquired in non-real time from a database comprising measurement values.

4. The method as claimed in claim 2, further comprising the step of obtaining the parameters or said at least one of wind and current measurements by the remote sensor during a time interval of at least two seconds.

5. The method as claimed in claim 3, further comprising the step of obtaining the parameters or said at least one of wind and current measurements by the remote sensor during a time interval of at least two seconds.

6. The method as claimed in claim 1, wherein the remote sensor is a coastal radar or automatic identification receiver external to said vessel.

7. The method of claim 6, wherein an optical system or a radar system comprises at least one coastal radar or at least one automatic identification receiver.

8. The method as claimed in claim 1, further comprising the step of receiving the parameters over a telecommunication system by a receiver of the remote land-based center.

9. The method as claimed in claim 8, wherein the telecommunication system is AIS, Iridium, Inmarsat or Argos.

10. The method as claimed in claim 1, further comprising the step of determining the over-ground vector for said each vessel by a computer located on another vessel.

11. The method as claimed in claim 1, further comprising the step of calculating the magnitude and the direction of the surface vector of said each vessel by summing the drift vector and the over-ground vector by the computer of the remote land-based center.

12. The method as claimed in claim 1, further comprising the steps of:
   obtaining a series of values of the speed over ground of said each vessel at various instants by the remote sensor, said values being calculated from at least two positions of said each vessel;
   processing the series of values obtained at the various instants using a signal processing element to filter components of a signal due to a surface current or wind; and
   calculating a value of a surface speed of said each vessel from the series of processed values by the computer of the remote land-based center.

13. The method as claimed in claim 12, wherein the series of values of the speed over ground of said vessel consists of values corresponding to the various instants at which the surface vector of said each vessel is collinear with the over-ground vector.

14. The method as claimed in claim 1, further comprising the step of representing the drift vector of said each vessel or its components due to a wind or current in real time or in non-real time in a predefined space.

15. A method for calculating each drift vector at every point on a path of said plurality of vessels, said each vessel progressing under the engine at the cruising speed, comprising the steps of:

calculating the surface vector of said each vessel according to method as claimed in claim 1;

obtaining, at said every point on the path of said each vessel, the parameters including its position, its heading, its speed over ground and its course over ground by the remote sensor; and calculating the drift vector by the computer of the remote land-based center at every point on the path of said each vessel by summing a norm of the surface vector and the over-ground vector calculated from the parameters for said each vessel.

16. A non-transitory computer readable storage medium comprising a series of instructions to calculate surface vectors of a plurality of vessels, each vessel progressing under an engine at a cruising speed, in response to said each vessel in a predefined position, said series of instructions executed by a computer of a remote land-based center causes the computer to:

obtain parameters of said each vessel including its position, its heading, its speed over ground and its course over ground from a remote sensor external to said each vessel;

obtain at least one of wind and current measurements in proximity to said each vessel using the remote sensor external to said each vessel;

determine a drift vector for said each vessel by processing said at least one of wind and current measurements;

determine an over-ground vector for said each vessel by processing at least one parameter selected from the position, the speed over ground and the course over ground of said each vessel; and simultaneously calculate a magnitude and a direction of a surface vector of said each vessel of said plurality of vessels under operational conditions progressing in an maritime area to monitor a maritime traffic over the maritime area.

17. The computer readable storage medium as claimed in claim 16, wherein said series of instructions executed by the computer of the remote land-based center further causes the computer to calculate each drift vector at every point on a path of said each vessel progressing under the engine at the cruising speed by: obtaining, at said every point on the path of said each vessel, the parameters including its position, its heading, its speed over ground and its course over ground; and calculating the drift vector at every point on the path of said each vessel by summing a norm of the surface vector and the over-ground vector calculated from the parameters for said each vessel.

* * * * *